Sept. 1, 1953
O. F. KERR
2,650,461
COTTON-PICKING MACHINE
Filed Dec. 12, 1952
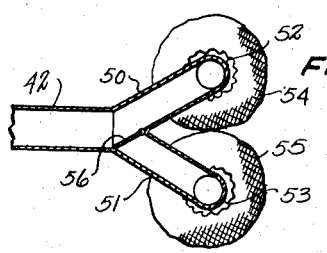
FIG. 3.
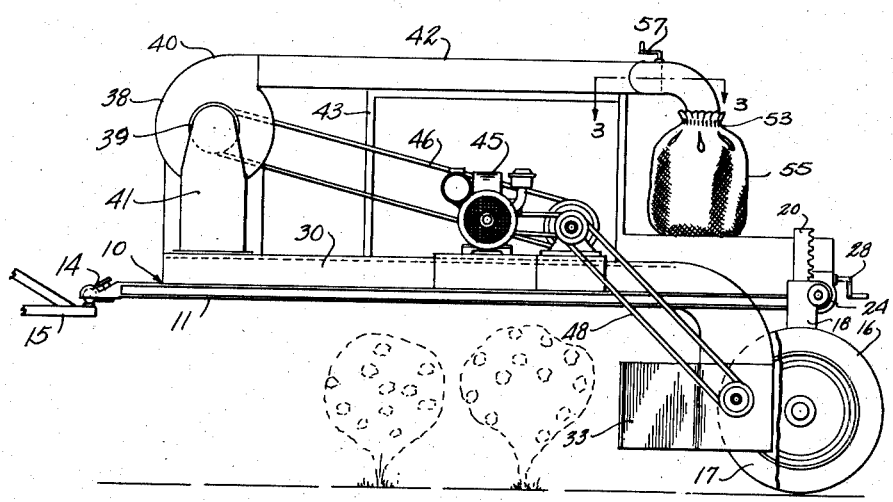
FIG. 1.
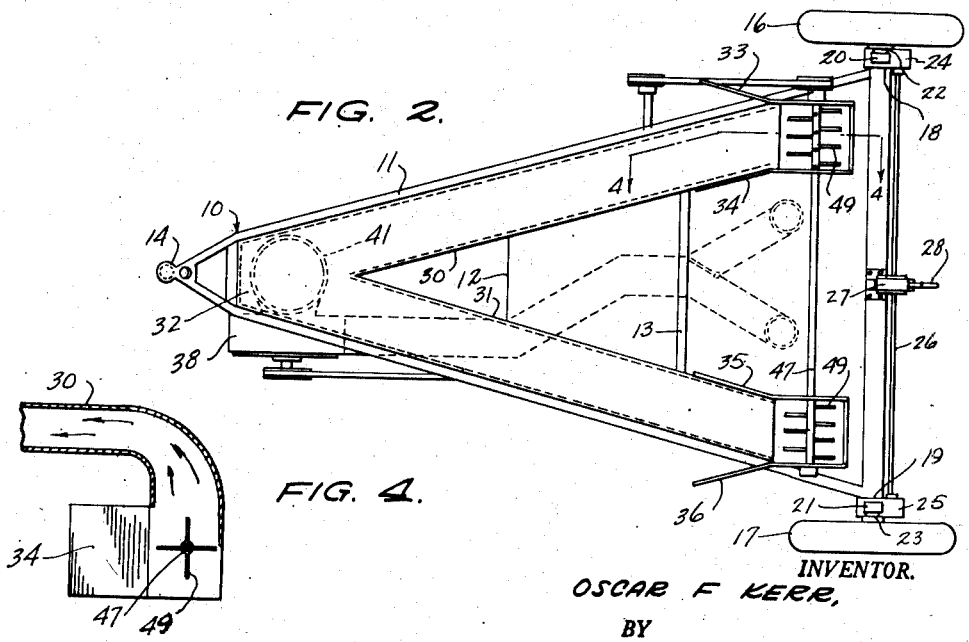
FIG. 2.
FIG. 4.
INVENTOR.
OSCAR F KERR,
BY
McMorrow, Berman & Davidson
ATTORNEYS Patented Sept. 1, 1953

2,650,461

UNITED STATES PATENT OFFICE 2,650,461

COTTON-PICKING MACHINE

Oscar F. Kerr, Sulphur Springs, Tex.

Application December 12, 1952, Serial No. 325,618

3 Claims. (Cl. 56—12)

This invention relates to cotton picking machines and more particularly to a simplified machine utilizing vacuum or suction for moving the bolls from the cotton plants.

It is among the objects of the invention to provide an improved cotton picking machine which can be towed by suitable traction means, such as an agricultural tractor, and moved continuously along rows of cotton plants to gather the bolls from the plants; which gathers the bolls by vacuum or suction assisted by mechanical agitators and discharges the gathered bolls into suitable receptacles for handling; which is vertically adjustable to accommodate it to cotton plants of different heights; and which is simple and durable in construction, economical to manufacture, easy to use, and effective and efficient in operation.

Other objects and advantages will become apparent from a consideration of the following description and the appended claims in conjunction with the accompanying drawing wherein:

Figure 1 is a side elevational view of a cotton picking machine illustrative of the invention;

Figure 2 is a bottom plan view of the machine illustrated in Figure 1;

Figure 3 is a fragmentary cross sectional view on the line 3—3 of Figure 1; and

Figure 4 is a fragmentary cross sectional view on the line 4—4 of Figure 2.

With continued reference to the drawing, the machine comprises a platform, generally indicated at 10, of substantially isosceles triangular shape having its apex at its front end and its base at its rear end and including a frame 11 and floor structures 12 and 13. A towing hitch device 14 projects forwardly from the front end of the frame for attachment to the hitch mechanism 15 of an agricultural tractor or other suitable traction means and ground engaging wheels 16 and 17 are disposed one at each side of the platform 10 at the rear end of the platform.

Vertically disposed sleeves 18 and 19 are mounted on the platform, one at each rear corner of the platform and extend downwardly from the platform substantially perpendicular thereto and rack bars 20 and 21 extend slidably through the sleeves 18 and 19 respectively. Stub axles 22 and 23 project perpendicularly outwardly from the rack bars 20 and 21 at the bottom ends of these rack bars and the wheels 16 and 17 are journaled on the stub axles 22 and 23 respectively.

Gear housings 24 and 25 are provided on the sleeves 18 and 19 near the upper ends of the sleeves and gears, and a shaft 26 extends across the rear end of the platform and is journaled at its respectively opposite ends in the gear housings 24 and 25. Gears, not illustrated, are mounted on the ends of the shaft 26 within the gear housings 24 and 25 and mesh with the teeth of the rack bars 20 and 21 respectively, and a third gear housing 27 is mounted on the platform 10 intermediate the length of the shaft 26 and the shaft extends through this third gear housing. A worm gear, not illustrated, is mounted on the shaft within the gear housing 27 and a worm, also not illustrated, is journaled in the housing 27 and meshes with the worm gear on the shaft 26. The worm is turned by a hand crank 28 to rotate the shaft 26 which, in turn, rotates the gears in the gear housings 24 and 25 and moves the rack bars 20 and 21 longitudinally through respective sleeves 18 and 19 to raise or lower the rear end of the platform 10 relative to the ground engaging wheels 16 and 17, so that the height of the platform can be adjusted for cotton plants of different heights. The worm and worm gear may have an irreversible pitch, so that no means are necessary for positively locking the rack bars at selected positions of longitudinal adjustment relative to the associated sleeves 18 and 19.

Ducts 30 and 31 are mounted on and extend longitudinally of the platform 10, these ducts being joined together at the front end of the platform, as indicated at 32, and extending divergently relative to each other from the front end to the rear end of the platform where they are curved downwardly through the platform and terminate substantially in a plane disposed below and parallel to the platform 10. The downwardly directed rear ends of the ducts 30 and 31 are open and guide vanes or deflectors in the form of flat plates of substantially rectangular shape are disposed at the forward sides of the downwardly directed rear end portions of the ducts. The guide vanes 33 and 34 are disposed forwardly of and at respectively opposite sides of the rear end of the duct 30 and are convergently inclined from a location spaced forwardly of the rear end of the duct to the front side of the downwardly extending rear end portion of the duct and similar rearwardly converging guide vanes or deflectors 35 and 36 are disposed in front of the downwardly extending rear end of the duct 31, the deflectors 33 to 36 inclusive being effective to guide the cotton plants under the downwardly opening rear ends of the ducts 30 and 31, so that the plants will be subjected to suction at the downwardly directed rear ends of the ducts.

A fan 38 is mounted on the platform above the front portions of the ducts 30 and 31 and has an inlet 39 and an outlet 40. A conduit 41 connects the interconnected front end portions of the ducts 30 and 31 to the inlet 39 of the fan 38 and a discharge duct 42 extends rearwardly from the fan outlet 40 above the platform 10, being supported above the platform by a suitable supporting frame 43 extending upwardly from the platform.

An engine 45 is mounted on the platform between the ducts 30 and 31 intermediate the length of these ducts and is drivingly connected to the fan 38 by a belt drive 46 and a shaft 47 extends transversely of the rear portion of the platform and through the ducts 30 and 31 near the rear or lower ends of these ducts and is driven from the engine by a belt drive 48.

Agitator spikes or fingers 49 project radially outwardly from the shaft 47 within each duct 30 and 31 near the rear or lower ends of these ducts, the spikes in each duct being spaced apart longitudinally of the shaft 47 and angularly spaced apart around the shaft, as illustrated in Figure 4, to perform a beating action on cotton plants passing under the downwardly directed rear ends of the ducts to assist the suction at the rear ends of the ducts in loosening bolls from the cotton plants and moving the loosened bolls upwardly into the rear ends of the ducts.

At its rear end the discharge duct 42 is divided into two divergent branches 50 and 51 and these branches are provided at their distal ends with bag holders 52 and 53 of a form well known to the art for holding woven bags 54 and 55 in connection with the downwardly directed distal end portions of the branches 50 and 51. A vane 56 is mounted in the duct 42 at the juncture of the inner sides of the branches 50 and 51 and is movable by suitable means, such as the hand lever 57 extending upwardly from the top of the duct 42 to selectively close the branches 50 and 51, so that the material forced by the fan through the discharge duct 42 can be selectively directed into the bags 54 and 55.

Obviously, the bagging equipment at the rear or discharge end of the duct 42 can be replaced by a duct extension for discharging the cotton into a wagon carried cage body of a construction well known to the art, if desired.

With this arrangement, the cotton bolls are loosened from the cotton plants by the suction at the rear ends of the ducts 30 and 31 assisted by the agitating fingers 49 on the shaft 47 and are drawn through the ducts 30 and 31 into the fan 38 from which they are discharged through the duct 42 into the bags connected to the bagging branches 50 and 51 or into any other suitable receptacle which may be provided.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A cotton picking machine comprising a platform structure having a front end and a rear end and a towing hitch structure on the front end thereof, wheels disposed one at each side of said platform at the rear end thereof, means connecting said wheels to said platform for vertical adjustment of said platform relative to said wheels, ducts mounted on said platform and having rear ends spaced apart transversely of said platform and downwardly curved to terminal positions below the platform, deflectors disposed one at each side of each duct at the rear ends of the ducts and convergently inclined from locations ahead of the rear ends of the corresponding ducts to the duct rear ends for guiding cotton plants past the open rear ends of the ducts a fan mounted on said platform and having an inlet and an outlet, an engine mounted on said platform and drivingly connected to said fan, conduit means connecting both of said ducts to the inlet of said fan, a shaft extending transversely of said platform and through said ducts near the open rear ends of the ducts, agitating elements carried by said shaft within the rear ends of said ducts, means drivingly connecting said engine to said shaft, and a discharge duct extending from the outlet of said fan above said platform.

2. A cotton picking machine comprising a platform structure having a front end and a rear end and a towing hitch structure on the front end thereof, wheels disposed one at each side of said platform at the rear end thereof, means connecting said wheels to said platform for vertical adjustment of said platform relative to said wheels, ducts mounted on said platform and having rear ends spaced apart transversely of said platform and downwardly curved to terminal positions below the platform, deflectors disposed one at each side of each duct at the rear ends of the ducts and convergently inclined from locations ahead of the rear ends of the corresponding ducts to the duct rear ends for guiding cotton plants past the open rear ends of the ducts, a fan mounted on said platform and having an inlet and an outlet, an engine mounted on said platform and drivingly connected to said fan, conduit means connecting both of said ducts to the inlet of said fan, a shaft extending transversely of said platform and through said ducts near the open rear ends of the ducts, agitating elements carried by said shaft within the rear ends of said ducts, means drivingly connecting said engine to said shaft, and a discharge duct extending from the outlet of said fan above said platform, said agitating elements comprising spikes projecting radially outwardly from said shaft with the spikes in each of said ducts spaced apart longitudinally of and angularly around said shaft.

3. A cotton picking machine comprising a platform structure having a front end and a rear end and a towing hitch structure on the front end thereof, wheels disposed one at each side of said platform at the rear end thereof, means connecting said wheels to said platform for vertical adjustment of said platform relative to said wheels, ducts mounted on said platform and having rear ends spaced apart transversely of said platform and downwardly curved to terminal positions below the platform, deflectors disposed one at each side of each duct at the rear ends of the ducts and convergently inclined from locations ahead of the rear ends of the corresponding ducts to the duct rear ends for guiding cotton plants past the open rear ends of the ducts, a fan mounted on said platform and having an inlet and an outlet, an engine mounted on said platform and drivingly connected to said fan, conduit means connecting both of said ducts to the inlet of said fan, a shaft extending transversely of said platform and through said ducts near the open rear ends of the ducts, agitating means carried by said shaft within the rear ends of said ducts, means drivingly connecting said engine to said shaft, and a discharge duct extending from the outlet of said fan above said platform, said platform being of substantially triangular shape and said ducts being joined together near the front end of said platform and extending divergently relative to each other toward the rear end of the platform with their rear end portions curved downwardly through said platform at spaced apart locations near the rear end of the platform.

OSCAR F. KERR.

No references cited.